G. W. BAKER.
ADJUSTABLE SAW-GUIDE.
No. 189,416. Patented April 10, 1877.
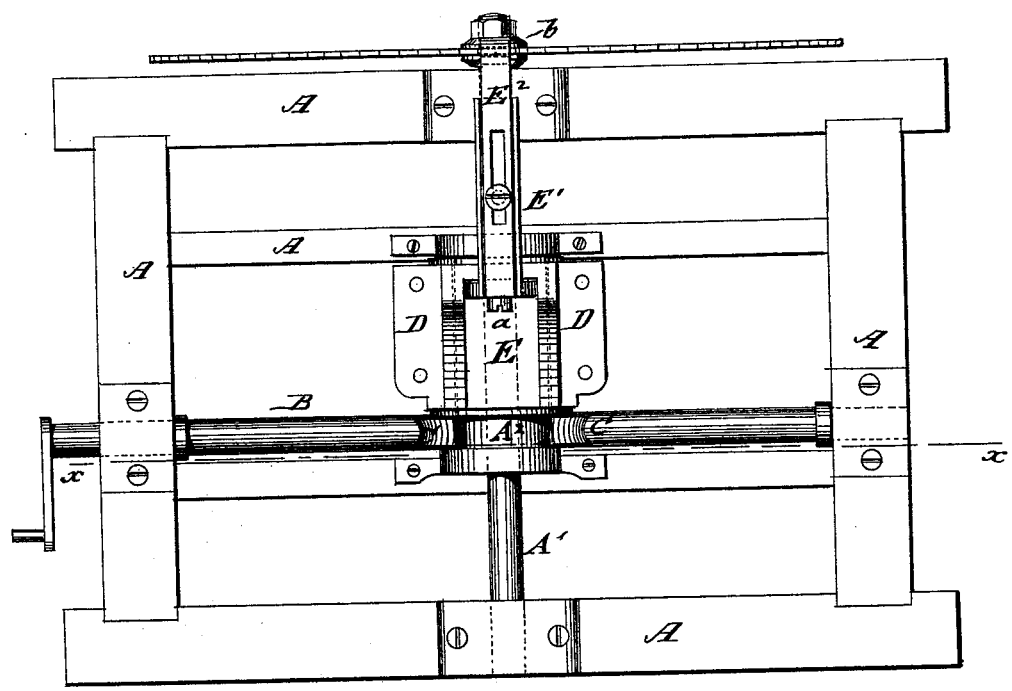
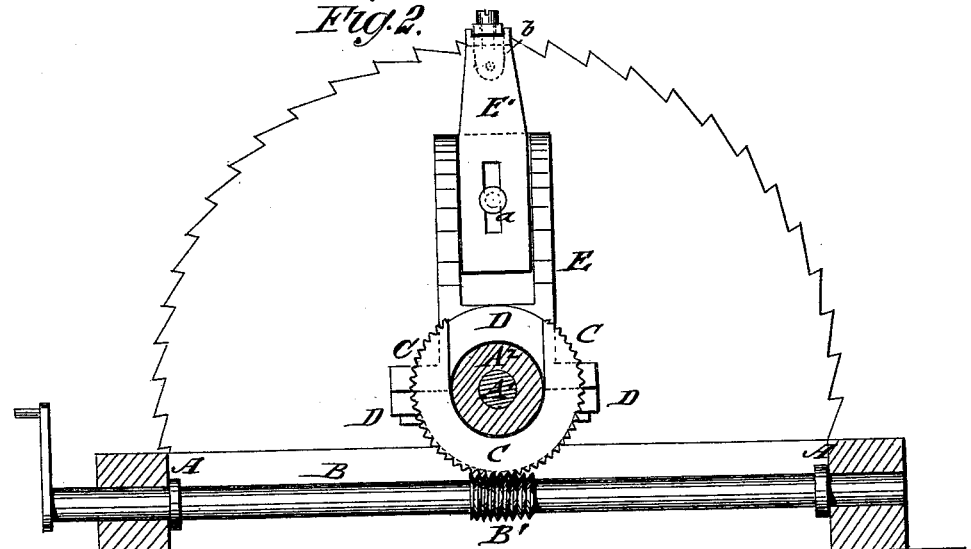
WITNESSES:
INVENTOR:
G. W. Baker.
BY
ATTORNEYS.

UNITED STATES PATENT OFFICE.

GEORGE W. BAKER, OF WATSONTOWN, PENNSYLVANIA.

IMPROVEMENT IN ADJUSTABLE SAW-GUIDES.

Specification forming part of Letters Patent No. 189,416, dated April 10, 1877; application filed March 3, 1877.

*To all whom it may concern:*

Be it known that I, GEORGE W. BAKER, of Watsontown, in the county of Northumberland and State of Pennsylvania, have invented a new and Improved Saw-Guide, of which the following is a specification:

In the accompanying drawing, Figure 1 represents a top view; Fig. 2, a vertical longitudinal drawing of my improved saw-guide on line $x\ x$, Fig. 1; and Fig. 3, a side view of the guide.

Similar letters of reference indicate corresponding parts.

This invention relates to an improved guide for circular saws, so that the same may be run with less loss of power through the log, and produce lumber of more uniform thickness, admitting the use of a thinner saw with less loss of wood. The slotted arm of the saw-guide, which embraces the edge of the saw, is attached to an arm that is adjusted radially around the saw-shaft by means hereinafter described.

In the drawing, A represents the supporting-frame of my circular saw, on which the shaft $A^1$ of the saw turns in suitable bearings. On the shaft of the circular saw is placed a sleeve, $A^2$, which is attached by suitable brackets to frame A. Between the brackets of the sleeve $A^1$ is arranged a second sleeve, D, made of semicircular parts and bolted together, of which the upper sleeve section is provided with a radial arm, E, in the recess of which a slotted elbow-shaped arm, E', is guided and adjusted by a set-screw, $a$. The upper part of the elbow-arm is again grooved for guiding a slotted adjustable arm, E', at the end of which the recessed saw-guiding lugs or cheeks $b$ are placed. The adjustability of the elbow-shaped arm E', in radial and lateral direction, admits the ready adjustment of the guide to circular saws of different diameters and distances from the radial arm E. The lower semi-section of sleeve D is provided with a sectional gear-wheel, C, that intermeshes with the worm B' of a crank-shaft, B, and admits the swinging down of the guide into horizontal position on frame A, for the purpose of getting out of the way of the log when the same is too large. The log is then first slabbed to the required size, so that it can pass under the guide, after which the guide is brought up by turning the crank-shaft, and the log sawed up. The sleeve to which the guide is attached turns independently of the saw-shaft, being separated therefrom by the fixed sleeve. The guide secures the running of the saw in a perfectly straight line through the log, and produces thereby lumber of uniform thickness. It is quickly thrown out of the way of the log by the worm-gear whenever the thickness of the log is too great to permit it to pass below the guide.

Having thus described my invention, I claim as new and desire to secure by Letters Patent—

The combination of the inclosing sleeve D, carrying the guide-supporting arm, and having a sectional gear-wheel, C, with a worm-wheel of crank-shaft B, to swing the guide down and out of the way, for the purpose specified.

GEORGE W. BAKER.

Witnesses:
AUSTIN STULL,
JAMES TAYLOR,
JNO. PETERMAN.